(12) United States Patent
Merchant et al.

(10) Patent No.: US 10,505,834 B2
(45) Date of Patent: Dec. 10, 2019

(54) SESSION AWARE ADAPTIVE PACKET FILTERING

(71) Applicant: Gigamon Inc., Santa Clara, CA (US)

(72) Inventors: Shehzad Merchant, Los Altos, CA (US); David Cheung, Cupertino, CA (US); Murali Bommana, Fremont, CA (US)

(73) Assignee: Gigamon Inc., Santa Clara, CA (US)

( * ) Notice: Subject to any disclaimer, the term of this patent is extended or adjusted under 35 U.S.C. 154(b) by 497 days.

(21) Appl. No.: 14/671,048

(22) Filed: Mar. 27, 2015

(65) Prior Publication Data

US 2016/0285713 A1 Sep. 29, 2016

(51) Int. Cl.
| | | |
|---|---|---|
| *H04L 12/26* | (2006.01) | |
| *H04L 29/06* | (2006.01) | |
| *H04L 12/801* | (2013.01) | |

(52) U.S. Cl.
CPC ............ *H04L 43/12* (2013.01); *H04L 43/028* (2013.01); *H04L 47/10* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 7,664,048 B1 * | 2/2010 | Yung | ........................ | H04L 41/28 370/235 |
| 8,681,794 B2 * | 3/2014 | Hill | ..................... | H04L 63/0245 370/392 |
| 9,426,071 B1 | 8/2016 | Caldejon et al. | | |
| 2001/0051865 A1 * | 12/2001 | Kerr | ........................ | H04L 45/00 703/27 |
| 2004/0010473 A1 * | 1/2004 | Hsu | ........................ | G06Q 10/10 705/77 |
| 2008/0259936 A1 * | 10/2008 | Hussain | .................. | H04L 45/00 370/397 |
| 2009/0262745 A1 * | 10/2009 | Leong | ................. | H04L 12/4625 370/396 |
| 2013/0054761 A1 * | 2/2013 | Kempf | ................ | H04L 12/4633 709/220 |
| 2015/0016477 A1 * | 1/2015 | Ogawa | .................... | H04L 45/64 370/503 |

OTHER PUBLICATIONS

Non-Final Office Action dated Sep. 20, 2018 for U.S. Appl. No. 15/629,556 of Shehzad Merchant, filed Jun. 21, 2017, 11 pages.
Final Office Action dated Apr. 1, 2019 for U.S. Appl. No. 15/629,556 of S. Merchant et al., filed Jun. 21, 2017, 14 pages.

* cited by examiner

*Primary Examiner* — Thomas J Dailey
(74) *Attorney, Agent, or Firm* — Perkins Coie LLP

(57) ABSTRACT

A method performed by a network device includes: receiving a first packet by the network device, wherein the first packet is tapped from a network; identifying a session to which the first packet belongs when the first packet has one or more values that at least partially match one or more terms, wherein the act of identifying the session is performed by the network device; receiving a second packet by the network device; determining whether the second packet belongs to the session; and performing a packet processing action by the network device based on the identified session; wherein the session is identified based on a first criterion, and the act of determining whether the second packet belongs to the session is performed based on a second criterion that is different from the first criterion.

41 Claims, 7 Drawing Sheets

SESSION AWARE ADAPTIVE PACKET FILTERING

FIELD

This application relates generally to network devices, and more specifically, to systems and methods for processing packets tapped from a network.

BACKGROUND

Network switch devices have been used to forward packets from one node to another node. For example, network switch devices have been used in traffic production network to communicate packets transmitted from a first node to a second node, wherein the second node is an intended recipient of the packets generated by the first node.

An embodiment described herein relates to another type of network switch device that operates in an out-of-band configuration. Such network switch device is configured to tap packets from a traffic production network, and therefore it is not a part of the traffic production network. Such network switch device may include one or more instrument ports for transmitting packets to one or more instruments for monitoring network traffic. An embodiment described herein provides a network switch device for processing packets for transmission to one or more network monitoring instruments based on an identified session.

SUMMARY

A method performed by a network device includes: receiving a first packet by the network device, wherein the first packet is tapped from a network; identifying a session to which the first packet belongs when the first packet has one or more values that at least partially match one or more terms, wherein the act of identifying the session is performed by the network device; receiving a second packet by the network device; determining whether the second packet belongs to the session; and performing a packet processing action by the network device based on the identified session; wherein the session is identified based on a first criterion, and the act of determining whether the second packet belongs to the session is performed based on a second criterion that is different from the first criterion.

Optionally, the one or more terms comprises a first term; the one or more values comprise a regular expression; and the act of identifying the session comprises determining whether the regular expression in the first packet at least partially matches the first term.

Optionally, the first packet and the second packet belong to different types of network traffic, respectively.

Optionally, the first packet belongs to a root conversation between two nodes, and the second packet belongs to a child conversation.

Optionally, the session is unidirectional.

Optionally, the session is bi-directional.

Optionally, the first packet is a copy of a packet being transmitted from a first node to a second node, and the second packet is a copy of a packet being transmitted from the second node to the first node.

Optionally, the act of performing the packet processing action comprises forwarding the first packet to one or more instrument ports at the network device, dropping the first packet, or modifying the first packet.

Optionally, the act of performing the packet processing action comprises forwarding all packets belonging to the session received after the first packet is received to one or more instrument ports at the network device.

Optionally, the act of performing the packet processing action comprises forwarding a subset of all packets belonging to the session received after the first packet is received to one or more instrument ports.

Optionally, the subset is user-defined based on a number of packets, and/or a prescribed duration.

Optionally, the act of performing the packet processing action comprises dropping some or all packets identified based on the second criterion, or forwarding some or all packets identified based on the second criterion to the one or more instrument ports.

Optionally, the act of performing the packet processing action comprises forwarding the first packet, and wherein the method further comprises: buffering packets associated with the session before the session is identified, wherein the act of buffering is performed until the session is identified; dropping or forwarding some or all of the buffered packets associated with the session after the session is identified; and dropping or forwarding additional packets, the additional packets being received by the network device after the session is identified.

Optionally, the method further includes receiving additional packets by the network device before the first packet is received.

Optionally, the method further includes buffering the additional packets until the session is identified.

Optionally, the act of performing the packet processing action comprises retroactively forwarding some or all packets belonging to the session in the additional packets to one or more instrument ports at the network device, or dropping some or all of the additional packets.

Optionally, the additional packets are buffered packets.

Optionally, a size of the buffered packets is based on a maximum buffering time and/or a maximum size.

Optionally, the buffered packets include packets belonging to the session that are received before the first packet, and method further includes retroactively identifying the packets belonging to the session from the buffered packets.

Optionally, the method further includes performing a cleaning process for the session when a user-defined time is reached, when a maximum number of sessions is reached, when there is an inactivity for a prescribed duration, or when another criterion is met.

Optionally, the network device comprises a single network appliance or multiple network appliances.

A network device includes: a network port for receiving a first packet and a second packet, wherein the first packet and the second packet are tapped from a network; one or more instrument ports for communication with one or more network monitoring instruments and/or one or more medium; and a processing unit coupled to the network port and the one or more instrument ports, wherein the processing unit is configured for identifying a session to which the first packet belongs when the first packet has one or more values that at least partially match one or more terms, determining whether the second packet belongs to the session, and performing a packet processing action based on the identified session; wherein the processing unit is configured to identify the session based on a first criterion, and to determine whether the second packet belongs to the session based on a second criterion that is different from the first criterion.

Optionally, the one or more terms comprises a first term; the one or more values comprise a regular expression; and the processing unit is configured for identifying the session by determining whether the regular expression in the first packet at least partially matches the first term.

Optionally, the first packet and the second packet belong to different types of network traffic, respectively.

Optionally, the first packet belongs to a root conversation between two nodes, and the second packet belongs to a child conversation.

Optionally, the session is unidirectional.

Optionally, the session is bi-directional.

Optionally, the first packet is a copy of a packet being transmitted from a first node to a second node, and the second packet is a copy of a packet being transmitted from the second node to the first node.

Optionally, the processing unit is configured to perform the packet processing action by forwarding the first packet to one or more instrument ports at the network device, dropping the first packet, or modifying the first packet.

Optionally, the processing unit is configured to perform the packet processing action by forwarding all packets belonging to the session received after the first packet is received to the one or more instrument ports.

Optionally, the processing unit is configured to perform the packet processing action by forwarding a subset of all packets belonging to the session received after the first packet is received to the one or more instrument ports.

Optionally, the subset is user-defined based on a number of packets, and/or a prescribed duration.

Optionally, the processing unit is configured to perform the packet processing action by dropping some or all packets identified based on the second criterion, or by forwarding some or all packets identified based on the second criterion to the one or more instrument ports.

Optionally, the processing unit is configure for performing the packet processing action by forwarding the first packet; wherein the network device further comprises a buffer for buffering packets associated with the session before the session is identified, and wherein the buffer is configured for buffering the packets associated with the session until the session is identified; and wherein the processing unit is further configured for: dropping or forwarding some or all of the buffered packets associated with the session after the session is identified; and dropping or forwarding additional packets, the additional packets being received by the network device after the session is identified.

Optionally, the network port is also for receiving additional packets before the first packet is received.

Optionally, the network device further comprises a buffer for buffering the additional packets until the session is identified.

Optionally, the processing unit is configured to perform the packet processing action by retroactively forwarding some or all of packets belonging to the session in the additional packets to the one or more instrument ports, or by dropping some or all of the additional packets.

Optionally, the network device further comprises a buffer for storing the additional packets as buffered packets.

Optionally, a size of the buffered packets is based on a maximum buffering time and/or a maximum size.

Optionally, the buffered packets include packets belonging to the session that are received before the first packet, and the processing unit is configured to retroactively identify the packets belonging to the session from the buffered packets.

Optionally, the processing unit is configured to perform a cleaning process for the session when a user-defined time is reached, when a maximum number of sessions is reached, when there is an inactivity for a prescribed duration, or when another criterion is met.

Optionally, the network device comprises a single network appliance or multiple network appliances.

A product includes a non-transitory medium storing a set of instruction, an execution of which by a processing unit in a network device causes a method to be performed, the method comprising: receiving a first packet by the network device, wherein the first packet is tapped from a network; identifying a session to which the first packet belongs when the first packet has one or more values that at least partially match one or more terms; receiving a second packet by the network device; determining whether the second packet belongs to the session; and performing a packet processing action based on the identified session.

A method performed by a network device includes: receiving a first plurality of packets by the network device, wherein the first plurality of packets are tapped from a network; storing the first plurality of packets in a buffer as buffered packets; receiving an additional packet by the network device after the first plurality of packets are received; identifying a session to which the additional packet belongs; and retroactively processing at least some of the buffered packets by the network device based on the identified session.

Optionally, the act of retroactively processing the at least some of the buffered packets comprises determining whether the at least some of the buffered packets belong to the identified session.

Optionally, the act of retroactively processing the at least some of the buffered packets comprises forwarding some or all packets belonging to the session in the buffered packets to one or more instrument ports at the network device.

Optionally, the buffered packets comprise a first buffered packet that is a copy of a packet being transmitted from a first node to a second node, and a second packet that is a copy of a packet being transmitted from the second node to the first node.

Optionally, the act of retroactively processing the at least some of the buffered packets comprises dropping at least one of the buffered packets, or modifying at least one of the buffered packets.

Optionally, the method further includes: receiving a second plurality of packets belonging to the identified session after the additional packet is received; and forwarding all of the second plurality of packets received after the additional packet is received to one or more instrument ports at the network device.

Optionally, the method further comprises: receiving a second plurality of packets belonging to the identified session after the additional packet is received; and forwarding a subset of the second plurality of packets received after the additional packet is received to one or more instrument ports.

Optionally, the subset is user-defined based on a number of packets, and/or a prescribed duration.

Optionally, a size of the buffered packets is based on a maximum buffering time and/or a maximum size.

A network device includes: a network port for receiving a first plurality of packets and for receiving an additional packet after the first plurality of packets are received, wherein the first plurality of packets are tapped from a network; one or more instrument ports for communication with one or more network monitoring instruments and/or one or more medium; a buffer for storing the first plurality of packets as buffered packets; and a processing unit coupled to the network port and the one or more instrument ports, wherein the processing unit is configured for identifying a session to which the additional packet belongs, and retroactively processing at least some of the buffered based on the identified session.

Optionally, the processing unit is configured for retroactively processing the at least some of the buffered packets by determining whether the at least some of the buffered packets belong to the identified session.

Optionally, the processing unit is configured for retroactively processing the at least some of the buffered packets by forwarding some or all packets belonging to the session in the buffered packets to the one or more instrument ports.

Optionally, the buffered packets comprise a first buffered packet that is a copy of a packet being transmitted from a first node to a second node, and a second packet that is a copy of a packet being transmitted from the second node to the first node.

Optionally, the processing unit is configured for retroactively processing the at least some of the buffered packets by dropping at least one of the buffered packets, or modifying at least one of the buffered packets.

Optionally, the network port is also for receiving a second plurality of packets belonging to the identified session after the additional packet is received; and wherein the processing unit is configured for forwarding all of the second plurality of packets received after the additional packet is received to the one or more instrument ports.

Optionally, the network port is also for receiving a second plurality of packets belonging to the identified session after the additional packet is received; and wherein the processing unit is configured for forwarding a subset of the second plurality of packets received after the additional packet is received to the one or more instrument ports.

Optionally, the subset is user-defined based on a number of packets, and/or a prescribed duration.

Optionally, a size of the buffered packets is based on a maximum buffering time and/or a maximum size.

A product includes a non-transitory medium storing a set of instruction, an execution of which by a processing unit in a network device causes a method to be performed, the method comprising: receiving a first plurality of packets by the network device, wherein the first plurality of packets are tapped from a network; storing the first plurality of packets in a buffer as buffered packets; receiving an additional packet by the network device after the first plurality of packets are received; identifying a session to which the additional packet belongs; and retroactively processing at least some of the buffered packets by the network device based on the identified session.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
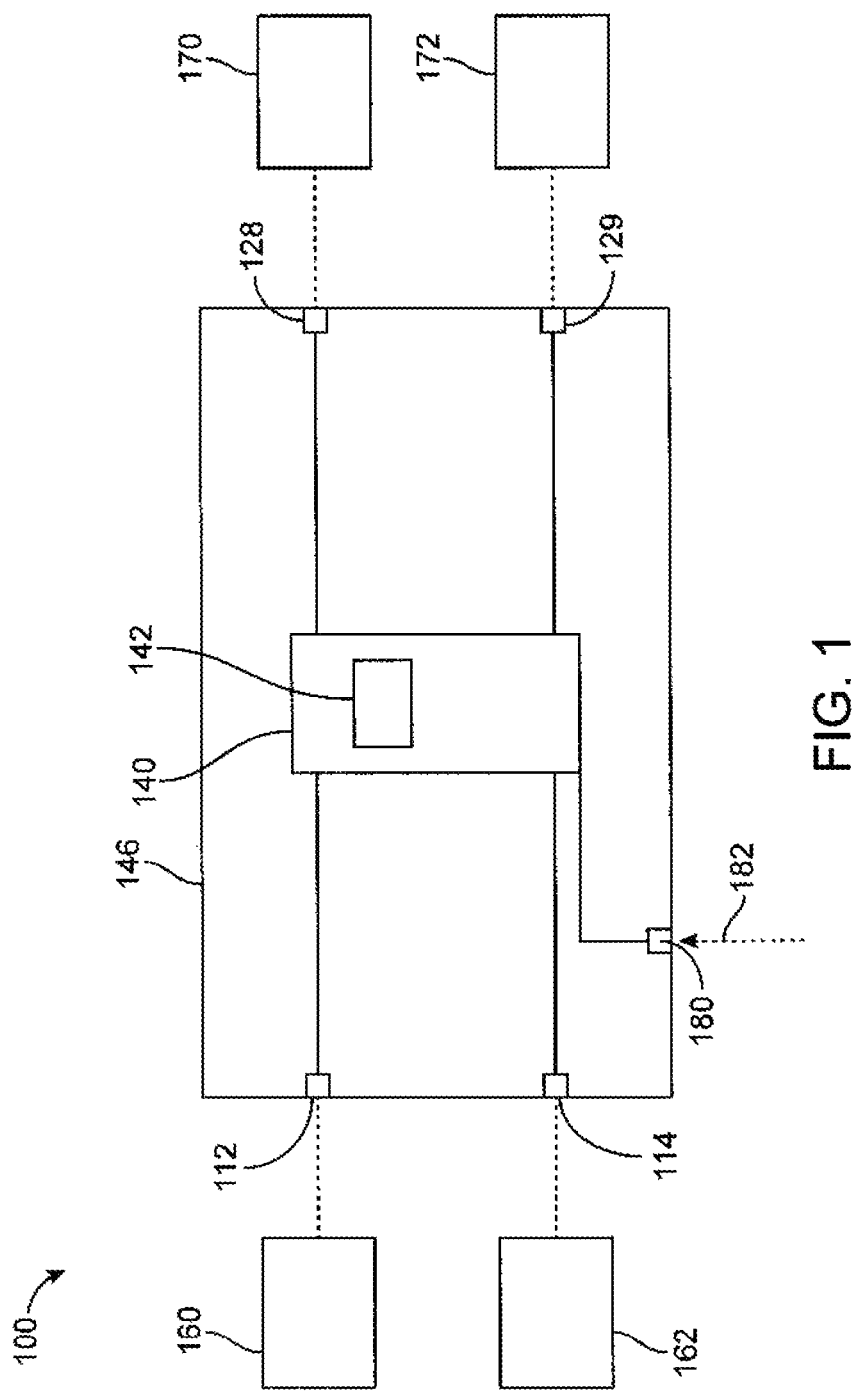
FIG. 1 illustrates a network device in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

An embodiment described herein provides a network device for identifying a session, and for processing packets for transmission to one or more instrument ports based on an identified session. The packets may be received after the session is identified, before the session is identified, or both.

FIG. 1 illustrates a network device 100 in accordance with some embodiments. The network device 100 includes a first network port 112, a second network port 114, a first instrument port 128, and a second instrument port 129. The device 100 also includes an integrated circuit 140 with a processing unit 142, and a housing 146 for containing the integrated circuit 140 and the integrated circuit 140. In the illustrated embodiments, the network device 100 also includes other components, such as a Network PHY (not shown) coupled to each of the respective ports 112, 114, wherein the Network PHYs may be considered to be parts of the integrated circuit 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the device 100 may include an optical transceiver, or a SERDES, etc. The housing 146 allows the device 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments, the device 100 may include more than two network ports. Also, although two instrument ports 128, 129 are shown, in other embodiments, the device 100 may include only one instrument port, or more than two instrument ports. In addition, in some cases, the network device 100 may not include any instrument ports for communication with network monitoring instruments. Furthermore, in some cases, the instrument ports 128, 129 may be configured to communicate with one or more instruments. The one or more instruments may be one or more network monitoring instruments. In other cases, the one or more instruments may be one or more non-transitory media, such as one or more storage devices, one or more databases, one or more servers, etc.

During use, the first network port 112 of the device 100 is communicatively coupled (e.g., via a network, such as the Internet) to a first node 160, and the second network port 114 is communicatively coupled (e.g., via a network, such as the Internet) to a second node 162. The network device 100 is configured to receive packets from nodes 160, 162 via the network ports 112, 114. In other cases, there may be only one network port (e.g., port 112). It should be noted that node 160/162 may represent a tap point or a device from which tapped packets are obtained. Also, during use, the instrument ports 128, 129 of the device 100 are communicatively coupled to respective instruments 170, 172. The instruments 170, 172 may be directly coupled to the device 100, or communicatively coupled to the device 100 through the network (e.g., Internet). In some cases, the device 100 is provided as a single unit that allows the device 100 to be deployed at a single point along a communication path.

In the illustrated embodiments, the network device 100 (e.g., the processing unit 142) is configured to receive packets from node 160 and/or node 162 via the respective network ports 112, 114, and process the packets in accordance with a predefined scheme. In particular, the processing unit 142 in the network device 100 is configured to analyze packets received from node 160 and/or node 162 to identify a session. Based on the identified session, the processing unit 142 then performs one or more packet processing functions, such as packet filtering, packet manipulation, and/or packet forwarding to one or more instrument ports (e.g., instrument ports 170, 172, etc.). In some cases, after the session has been identified, the processing unit 142 may forward all packets belonging to the session received subsequently to one or more instrument ports. Alternatively, the processing unit 142 may forward a subset of all packets belonging to the session received subsequently to one or more instrument ports. The subset may be based on user provided criteria, such as a number of packets and/or a time duration.

Also, in some embodiments, the network device 100 may further include a buffer for storing packets as buffered packets. In such cases, after the session is identified based on a current packet, the processing unit 142 may then retroactively process the previously received packets that are stored in the buffer. For example, the processing unit 142 may determine whether any of the buffered packets belong to the identified session, and may perform one or more packet processing functions (such as packet filtering, packet manipulation, and/or packet forwarding to one or more instrument ports (e.g., instrument ports 170, 172, etc.)) on the buffered packets that belong to the identified session. The size of the buffered packets may be configurable based on user input in some cases. For example, the size of the buffered packets may be based on a defined maximum number of packets (e.g., storing a maximum of 500 gigabytes of data, etc.) and/or a defined maximum duration (e.g., store packets that are received within 30 minutes, etc.). In some cases, the buffer may store all packets until a session is later identified by the processing unit 142. Also, in some embodiments, the network device 100 may be configured to clear the buffer when there is no longer any interest to continue to match packets in a session. The buffer may be located in the housing 146 of the network switch. Alternatively, the buffer may be located outside the housing 146 (e.g., it may be communicatively coupled to the processing unit 142 from outside the housing 146).

In some embodiments, one or more of the network ports 112, 114 may be configured to receive normal packets (e.g., packets not from a virtualized network), as well as virtualized packets (e.g., packets with tunnel format that includes encapsulation of the original packets resulted from virtualization technology). In other embodiments, one or more the network ports 112, 114 may be configured to receive only non-virtualized packets. In further embodiments, one or more the network ports 112, 114 may be configured to receive only virtualized packets.

In one or more embodiments, the integrated circuit 140 may be any switch module that provides packet transmission in accordance with a pre-determined transmission scheme. In some embodiments, the integrated circuit 140 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, a database, etc., or the instrument may be a pass-through device (i.e., it can receive packets, and transmit the packets back to the device 100 after the packets have been processed), such as an intrusion prevention system.

In other embodiments, the integrated circuit 140 may be configured such that the packets may be transmitted in a one-to-many configuration (i.e., from one network port to multiple instrument ports).

In other embodiments, the integrated circuit 140 may be configured such that the packets may be transmitted in a many-to-many configuration (i.e., from multiple network ports to multiple instrument ports).

In further embodiments, the integrated circuit 140 may be configured such that the packets may be transmitted in a many-to-one configuration (i.e., from multiple network ports to one instrument port).

In some embodiments, the one-to-one, one-to-many, many-to-many, and many-to-one configurations are all available for allowing a user to selectively configure the device 100 so that the packets (or certain types of packets) are routed according to any one of these configurations. In some embodiments, the packet movement configuration is predetermined such that when the network device 100 receives the packets, the network device 100 will automatically forward the packets to the ports based on the predetermined packet movement configuration (e.g., one-to-one, one-to-many, many-to-many, and many-to-one).

In accordance with some embodiments, the integrated circuit 140 may have the functionalities of a conventional packet switch except that it provides visibility into various parts of a network. Thus, embodiments of the integrated circuit 140 may operate like a conventional managed packet switch, but providing packet monitoring function. This is accomplished by configuring the integrated circuit 140 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the integrated circuit 140 may be an "out-of-band" network switch, which is configured to obtain packets and pass them to an instrument or to a network that is different from that associated with the original intended destination of the packets.

Also, the term "out-of-band" device/switch refers to a device that is not involved in a transmission of a packet (that is transmitted from node 1 and intended for reception by node 2) to the intended receiving node 2. In some cases, a device may be both an in-band device and an out-of-band device with respect to processing different packets. For example, the network device 100 may be an in-band device if it receives a packet (intended for transmission from node 1 to node 2) from a network, and passes the packet back to the network (e.g., after the packet has been processed by a pass-through monitoring tool) for transmission downstream to the node 2. The same network device 100 may also be an out-of-band device if it receives another packet from the network, and does not pass the packet back to the network for transmission to the intended receiving node.

It should be noted that the integrated circuit 140 that may be used with the device 100 is not limited to the examples described above, and that other integrated circuits 140 with different configurations may be used as well. Also, in one or more embodiments described herein, the integrated circuit 140 may be implemented using a processor (e.g., a general purpose processor, a network processor, an ASIC processor, a FPGA processor, etc.).

In other embodiments, the network device 100 may optionally include an additional processing unit (e.g., a processor) communicatively coupled to the processing unit 142. The additional processing unit may be used to perform additional packet processing, such as header stripping, in some embodiments. For example, in some embodiments, the additional processing unit may be configured to receive only packets with a tunnel format, such as that used in a virtualized network. In one implementation, the processing unit 142 or the integrated circuit 140 is configured to pass all packets with a tunnel format to the additional processing unit, and does not pass packets without any tunnel format (e.g., packets that are not associated with a virtualized network) to the additional processing unit. Upon receiving a packet with a tunnel format, the additional processing unit then removes one or more headers from the packet. By means of non-limiting examples, the additional processing unit may be configured to remove an outer MAC header, an outer IP header, an outer UDP header, or any combination of the foregoing, from the packet. In some embodiments, after the additional processing unit performs header stripping on the packet, the additional processing unit then passes the packet back to the integrated circuit 140. The integrated circuit 140 then transmits the packet to one or more of the instrument ports 128, 129 according to a pre-determined transmission scheme (e.g., one-to-one, one-to-many, many-to-one, many-to-many, etc.) as discussed previously. In other embodiments, in addition to performing packet stripping, the additional processing unit may also be configured to perform other packet processing functions on the received packet. In some embodiments, the additional processing unit may be located outside the housing of the network device 100. In other embodiments, the additional processing unit may be a part of the integrated circuit 140. For example, the additional processing unit may be considered to be a part of the processing unit 142. Also, in some embodiments, the additional processing unit may be a general purpose processor, a network processor, an ASIC processor, a FPGA processor, or any of other types of processor. In other embodiments, the additional processing unit may be any hardware, software, or combination thereof.

In the illustrated embodiments, the processing unit 142 is illustrated as a component of the integrated circuit 140. In some cases, the processing unit 142 may be one or more processors in the integrated circuit 140. In other cases, the processing unit 142 may be one or more circuit components that are parts of the integrated circuit 140. In other embodiments, the processing unit 142 may be a separate component from the integrated circuit 140. The processing unit 142 may be implemented using a processor, such as a general processor, a network processor, an ASIC processor, a FPGA processor, etc. In other embodiments, the processing unit 142 may be a field processor. In further embodiments, the processing unit 142 may be a network card. The processing unit 142 may be implemented using one or more processors, wherein one or more of the processors may be considered to be a part of the network device 100 or not. Also, in some embodiments, the integrated circuit 140 may include ternary content-addressable memory (TCAM). The integrated circuit 140 may be configured to perform various packet processing functions, included but not limited to packet filtering, packet routing, packet switching, packet mirroring, packet aggregation, etc.

As shown in the figure, the network device 100 further includes a port 180 for receiving configuration information 182 to thereby configure the integrated circuit 140 (e.g., the processing unit 142 in the packet switch). In some embodiments, the port 180 may be a separate and different port from the network ports 112, 114. In other embodiments, the port 180 may be a network port, like the network ports 112, 114, or may be implemented using one or both of the network ports 112, 114. In such cases, in addition to receiving the information 182, the port 180 may also receive network traffic that are being communicated between nodes (e.g., nodes 160, 162). Also, in further embodiments, the device 100 may include multiple ports 180 for receiving configuration information 182. In some cases, one or more of the ports 180 may be used to implement the network ports 112, 114, thereby allowing the same port(s) 180 for receiving the configuration information 182 to also receive network traffic.

Figure 2:
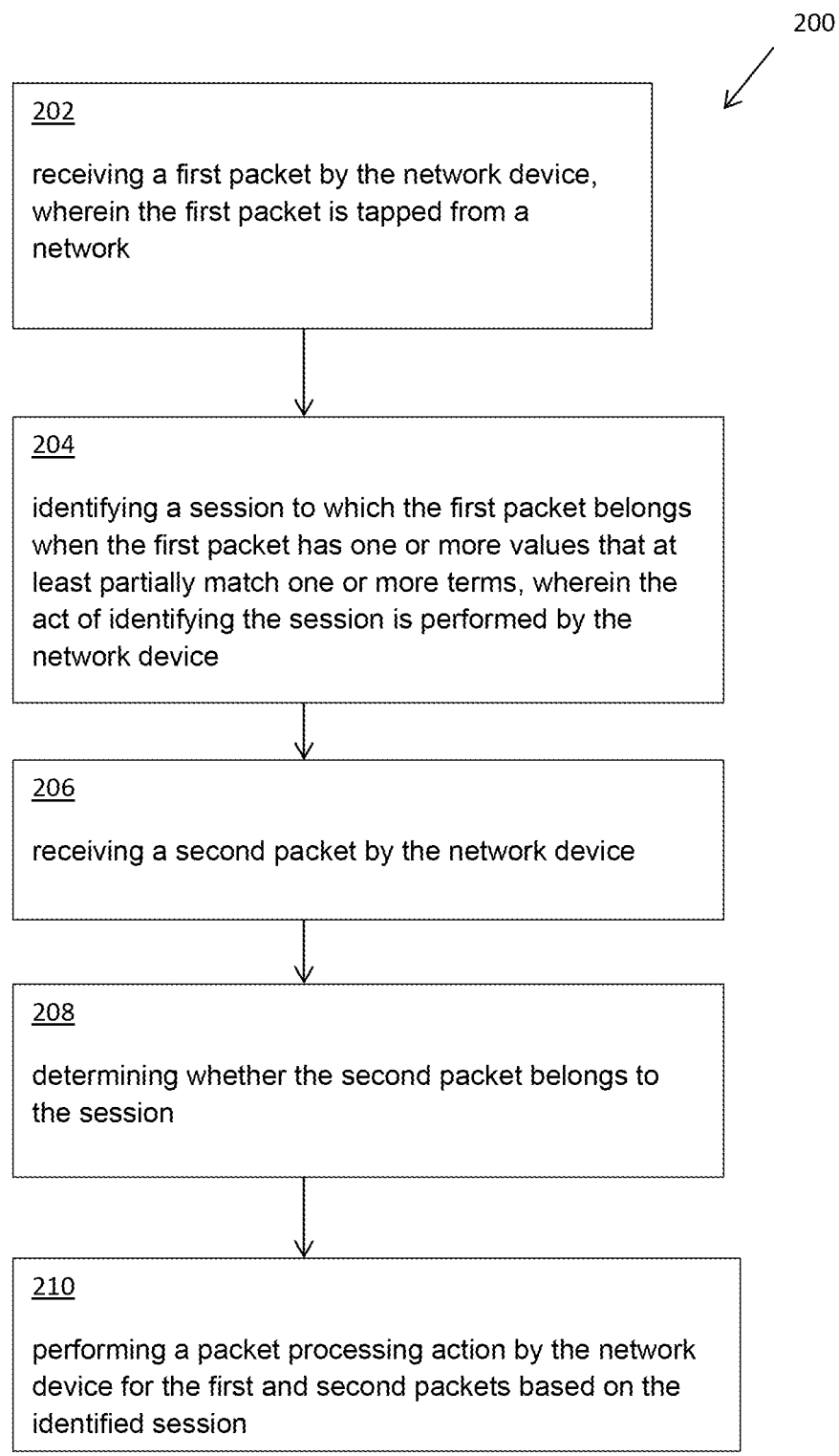
FIG. 2 illustrates a method performed by a network device.

FIG. 2 illustrates a method 200 performed by the network device 100 of FIG. 1 in accordance with some embodiments. In other embodiments, the method 200 may be performed by other types of network devices, or other devices having different configurations as those described with reference to FIG. 1.

First the network device 100 receives a first packet that is tapped from a network (item 202). It should be noted that the term "tapped" or any of similar terms (e.g., tap, tapping) refers to the act of obtaining packet from a network, which may be accomplished using any technique (e.g., port mirroring, tap device, etc.). In some cases, the act of receiving the first packet may be performed by one or more network ports (e.g., network port 112, network port 114, etc.) at the network device 100. In other cases, the act of receiving the first packet may be performed by the processing unit 142.

Next, the processing unit 142 identifies a session based on the first packet (item 204). In the illustrated embodiments, the session to which the first packet belongs is identified when the first packet has one or more values that at least partially match one or more terms. In some cases, the one or more terms may comprise a first term, the one or more values may comprise a regular expression, and the act of identifying the session may include determining whether the regular expression in the first packet at least partially matches the first term. In other cases, the one or more terms may include a string, or a combination of a string and a regular expression.

Next, the network device 100 receives a second packet (item 206).

Next, the processing unit 142 determines whether the second packet belongs to the previously identified session (item 208).

Next, the processing unit 142 performs a packet processing action based on the identified session (item 210). In some cases, the act of performing the packet processing action may include forwarding the first packet to one or more instrument ports at the network device 100, dropping the first packet, or modifying the first packet. In some cases, packet dropping may be desirable because a certain network monitoring tool may not care certain types of traffic. For example, in some cases, a user may be interested that there is youtube video being transmitted, but not the youtube content itself. In such cases, the youtube video packets may be dropped. Packet dropping may also be desirable for offloading tool(s). For example, some or all traffic associated with a certain session may be dropped (e.g., discarded). Also, the act of performing the packet processing action may further include forwarding some or all packets (belonging to the identified session) received after the first packet is received to one or more instrument ports at the network device. For example, the packet processing action may be a user-configured action that prescribes a certain number of packets to be forwarded (e.g., forward the next 20 packets, etc.).

Alternatively, or additionally, the act of performing the packet processing action may include forwarding a subset of all packets (belonging to the identified session) received after the first packet is received to one or more instrument ports. In some cases, the subset may be user-defined based on a number of packets (e.g., forward only the first 30 packets, etc.), and/or a prescribed duration (e.g., forward only packets received within 3 minutes, etc.). Forwarding only a subset of all packets belonging to a same session may be desirable in some cases, because a user of the network device 100 may not be interested in receiving all packets belonging to the same session. For example, the user may be interested in determining statistics indicating a number of successfully transmitted sessions. In such cases, if a certain number of packets (e.g., 20) has been successfully transmitted, then it may be inferred that the rest of the packets will also be transmitted successfully.

In one implementation, for performing items 204 and 210, the processing unit 142 may be configured to inspect protocol headers inside a packet and then perform forward or drop action based on the values of the protocol header fields. The processing unit 142 may also search for specific data pattern at a particular offset, between two offsets, or the whole packet. Protocol headers that the processing unit 142 may inspect may include Ethernet, VLAN, MPLS, VNTAG, IPv4, IPv6, TCP, UDP, GTP, VXLAN, ERSPAN, GRE, etc.

Sometimes all packets belonging to the same traffic flow or session may be needed by the network monitoring instrument(s). The processing unit 142 may be configured to identify traffic belonging to the same flow session. When a packet matches a filter rule defined in the network device 100, the processing unit 142 will gather the flow session information from that packet and subsequent packets belong to the same flow session will be identified and forward to the same network monitoring instrument(s). Flow session may be user defined and may include source IP address, destination IP address, source layer 4 port number, destination layer 4 port number, protocol value in IP header, source MAC address, destination MAC address, MPLS label, VLAN-id, IPv4 TOS, GTPU-TEID, or any combination of the above protocol header fields.

In some cases, the session identified by the processing unit 142 in item 204 is based on a first criterion, and the act of determining whether the second packet belongs to the session by the processing unit 142 in item 208 is performed based on a second criterion that is different from the first criterion. Accordingly, the first criterion for identifying the session may differ from the second criterion for identifying other packets that are associated with (e.g., belonging to) the session. Thus, the definition of "session" may be based on a number of different criteria. Such technique allows the first and second packets to be grouped as belonging to a same session, which may otherwise be considered as unassociated with each other. In some embodiments, the first criterion and/or the second criterion may be based on packet header information. Also, in some embodiments, the first criterion may be a regular expression pattern, which when matched by a packet, would indicate that a session has been identified, and the second criterion may be based on header information (such as source IP, destination IP, source TCP, destination TCP, UDP port, etc., or any combination of the foregoing).

Also, in some cases, the above technique allows different types of network traffic to be considered as parts of a same session. For example, the criteria for identifying the session may be based on a matching of a certain regular expression (e.g., "Washington" or "ington") in an email packet. After the session is identified, the processing unit 142 may look for additional packets that have the same regular expression, regardless of whether the additional packets are email packets or not. For example, the second packet may be a web packet that has the same regular expression. In such cases, the processing unit 142 may determine that the second packet belong to the same session to which the first packet also belongs. Thus, in some cases, the above technique allows different types of network traffic to be considered as parts of a same session.

Also, in some cases, the first packet may belong to a root conversation (e.g., TCP root conversation) between two nodes, and the second packet may belong to a child conversation (e.g., TCP child conversation).

In further cases, the first packet may belong to a first webpage content, and the second packet may belong to a second webpage content, wherein the first and second webpage contents may belong to different respective frames that are opened in a browser.

In still further cases, if there is a match and a session has been identified, then the processing unit 142 may process subsequent packets that belong to the same session (even if there are no matches in subsequent packets). For example, in some embodiments, a first criterion, such as a regular expression or regular expression pattern, may be used by the network device to determine if there is a match by a packet. If there is a match, it would indicate that a session has been identified. Also, a second criterion, such as header information (e.g., source IP, destination IP, source TCP, destination TCP, UDP port, etc., or any combination of the foregoing) may be used to determine if additional packets (e.g., packets received before and/or after the session has been identified) are associated with the identified session. Accordingly, even if an additional packet (received before or after the session is identified) does not meet the first criterion, the additional packet may be considered as belonging to the identified session if the additional packet satisfies the second criterion.

In some embodiments, the processing unit 142 may be configured to identify packets belonging to a session that is unidirectional, and perform packet processing on those identified packets. In other embodiments, the processing unit 142 may be configured to identify packets belonging to a session that is bi-directional, and perform packet processing on those identified packets. For example, the first packet may be a copy of a packet being transmitted from a first node to a second node, and the second packet may be a copy of a packet being transmitted from the second node to the first node. For bi-directional session, after the session is identified, the processing unit 142 may identify all packets (i.e., packets being communicated in both directions) received afterwards that belong to that session, and perform packet processing on those packets.

In some cases, the processing unit 142 may also be configured to retroactively perform packet processing for packets that are received before the session is identified, wherein the act of retroactively performing packet processing is performed after the session is identified. For example, the method 200 may further include receiving additional packets by the network device 100 (e.g., by one or more network ports at the network device 100) before the first packet is received. The packets may be stored in a buffer as buffered packets. The buffer, which is communicatively coupled to the processing unit 142, may be inside the housing 146 of the network device 100, or may be external to the housing 146 of the network device 100. In some cases, a size of the buffered packets may be based on a maximum buffering time and/or a maximum size, which is defined by a user.

In some cases, the act of retroactively performing packet processing may involve the processing unit 142 analyzing the buffered packets to identify all packets that belong to the identified session. Also, the act of retroactively performing packet processing may include dropping a packet, modifying a packet, or forwarding a packet, based on the identified session. For example, some or all packets belonging to a session may be dropped.

In some cases, the act of retroactively performing the packet processing action may include retroactively forwarding all of the packets (belonging to the identified session) in the buffered packets to one or more instrument ports at the network device 100. Such feature may be advantageous because there may be cases where the network monitoring instrument(s) need a complete TCP flow including the initial TCP handshake. If the matching for identifying a session occurs on data after the TCP handshake, the processing unit 142 will be able to retroactively provide the TCP handshake packets by processing the buffered packets that were received before the session is identified, thereby allowing a complete TCP bidirectional flow be forwarded to the network monitoring instrument(s).

Also, in some cases, the act of retroactively performing the packet processing action may include retroactively forwarding some (but not all) of the packets (belonging to the identified session) in the buffered packets to one or more instrument ports at the network device 100. For example, in the scenario in which only some, but not all, of the packets belonging to the identified session are forwarded, a user may prescribe a certain number of packets (e.g., the first 100 packets, etc.) be forwarded. Alternatively, the user may prescribe a duration (e.g., packets received within 10 minutes, etc. be forwarded).

In some cases, if a match does not occur within a certain user-defined number of packets or user-defined duration, then the previously buffered packets may be dropped, forwarded (e.g., to a device for storage), or modified based on user criteria.

It should be noted that the method 200 is not limited to the order of the items 202-210 described previously, and that the order of the items 202-210 may be different in different embodiments. For example, in other cases, the item 210 may be performed first before item 206 and/or item 208 is performed. Also, in other cases, item 206 may be performed before item 204 is performed.

In the above embodiments, the network device 100 is illustrated as having instrument ports 128, 129 for outputting packets to respective network monitoring instruments 170, 172. In other embodiments, the network device 100 may have only one instrument port for communication with only one network monitoring instrument.

Also, in some embodiments, the integrated circuit 140 may be a specialized integrated circuit configured to perform various functions described herein. In addition, in some embodiments, the processing unit 142 may be a specialized processing unit configured to perform various functions described herein. The processing unit 142 and the integrated circuit 140 improve existing technology. For example, the network device 100 allows packets that may previously be considered to be unrelated or belonging to different sessions, to be identified as belonging to a same session for the purpose of passing the packets downstream (e.g., to one or more network monitoring instruments and/or to one or more media). Also, the network device 100 allows previously buffered packets to be retroactively forwarded downstream (e.g., to one or more network monitoring instruments and/or to one or more media) that is believed to be not possible or not done previously.

Figure 3:
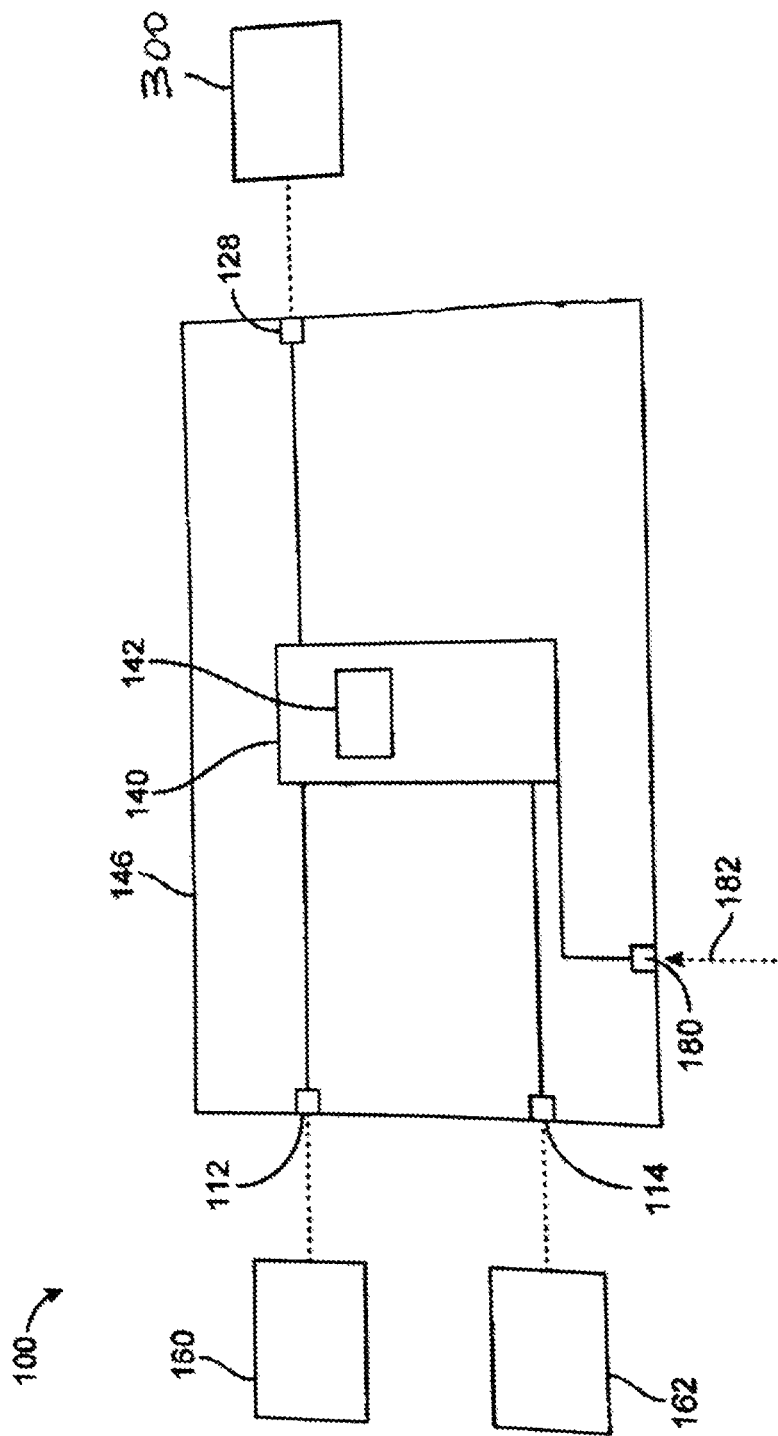
FIG. 3 illustrates another network device in accordance with other embodiments.

Also, in other embodiments, one or more instrument ports may be configured to communicate with one or more non-transitory medium. FIG. 3 illustrates another network device 100 in accordance with other embodiments. The network device 100 of FIG. 3 is the same as the network device of FIG. 1, except that the network device 100 of FIG. 3 has an instrument port for communication with a storage system 300. The storage system 300 may include one or more non-transitory media, such as one or more storage devices, one or more databases, etc. In other embodiments, instead of one instrument port for communication with the storage system 300, the network device 100 may have multiple instrument ports for communication with respective storage systems. The network device of FIG. 3 may be configured to perform the method 200 described with reference to FIG. 2.

In the above embodiments, the network device 100 has been described as being configured to identify packets belonging to a same user-defined session for transmission downstream to one or more network monitoring instrument, and/or for determining which instrument port(s) to pass packets to network monitoring instrument(s). In other embodiments, instead of transmitting the packets to one or more network monitoring instrument, the packets may be transmitted to a non-transitory medium (e.g., one or more storage devices, one or more databases, one or more datacenters, etc.) via the one or more instrument ports.

Figure 4:
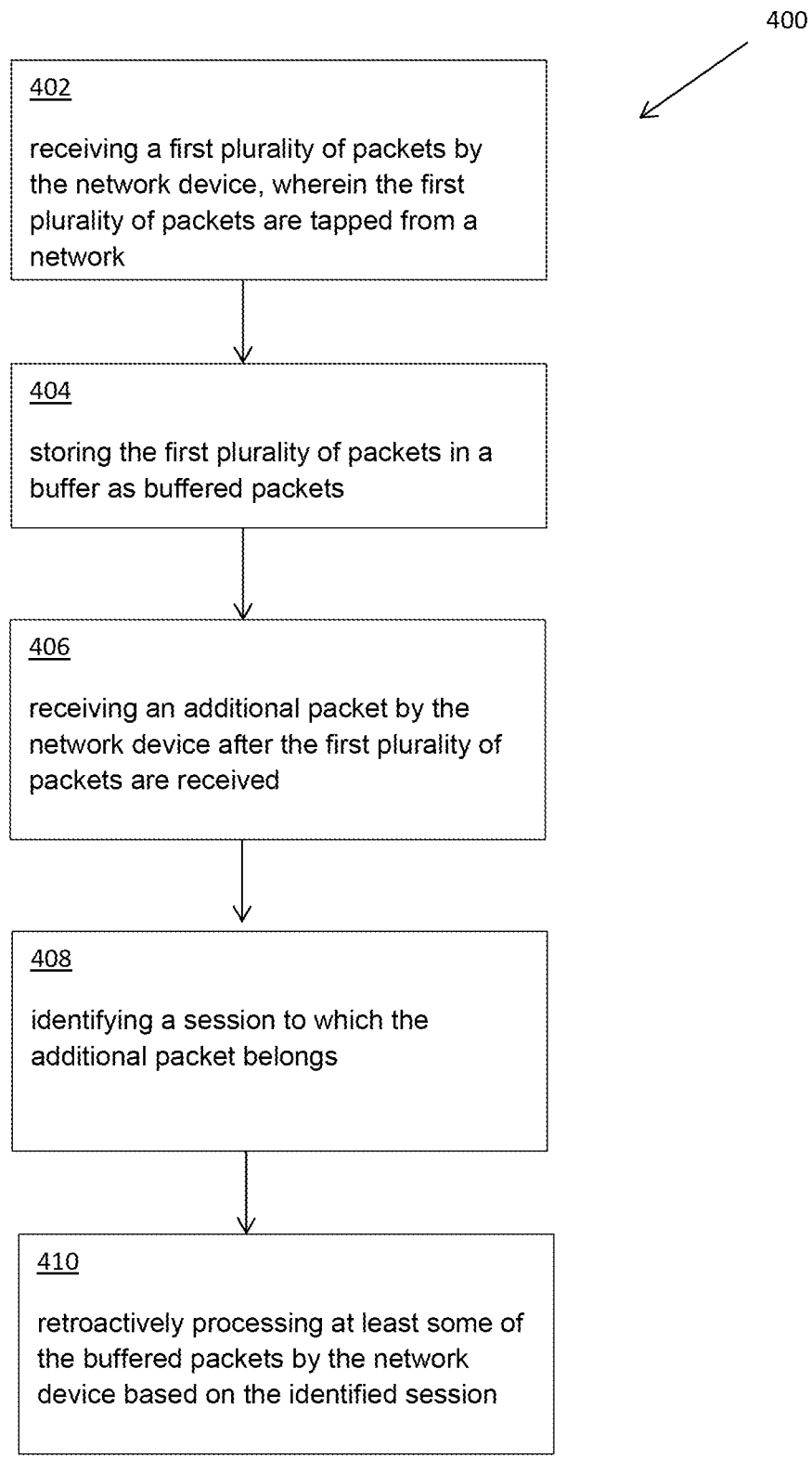
FIG. 4 illustrates another method performed by a network device.

As discussed, the processing unit 142 may be configured to retroactively process buffered packets received before a session is identified. In some cases, such feature may be implemented regardless of how a session is identified, and/or regardless of whether packets are received and processed after the session is identified. FIG. 4 illustrates a method 400 of retroactively processing buffered packets performed by the network device 100 of FIG. 1 in accordance with some embodiments. In other embodiments, the method 400 may be performed by other types of network devices, or other devices having different configurations as those described with reference to FIG. 1.

First, a first plurality of packets is received by the network device 100, wherein the first plurality of packets is tapped from a network (item 402). In some cases, the act of receiving the first plurality of packets may be performed by one or more network ports (e.g., network ports 112, 114) at the network device 100. In other cases, the act of receiving the first plurality of packets may be performed by the processing unit 142.

Next, the first plurality of packets is stored in a buffer as buffered packets (item 404). The buffer, which is communicatively coupled to the processing unit 142, may be one or more media in the housing 146 of the network device 100, or one or more media outside the housing 146. In some cases, a size of the buffered packets is based on a maximum buffering time and/or a maximum size. For example, a user may configure the buffer to store a maximum of 400 Gigabytes of packet. As another example, the user may configure the buffer to store packets received within the last 30 minutes. In further example, the user may configure to store packets received within the last 30 minutes, or a maximum of 400 Gigabytes of packets, whichever occurs first.

Next, an additional packet is received by the network device after the first plurality of packets are received (item 406). In some cases, the act of receiving the additional packet may be performed by one or more network ports (e.g., network ports 112, 114) at the network device 100. In other cases, the act of receiving the additional packet may be performed by the processing unit 142.

Next, the processing unit 142 identifies a session to which the additional packet belongs (item 408). Any technique may be used to identify a session to which the packet belongs. For example, in one implementation, when a packet has one or more values (e.g., one or more string, one or more regular expression, or both) that match one or more predefined values, then the processing unit 142 may determine that a session has been identified.

Next, the processing unit 142 retroactively processes at least some of the buffered packets based on the identified session (item 410). In some cases, the act of retroactively processing the at least some of the buffered packets comprises determining whether the at least some of the buffered packets belong to the identified session. The packets in the buffered packets belonging to the identified session may be in a unidirectional session. Alternatively, the packets in the buffered packets belonging to the identified session may be in a bi-directional session. For example, the buffered packets may have a first buffered packet that is a copy of a packet being transmitted from a first node to a second node, and a second packet that is a copy of a packet being transmitted from the second node to the first node.

Also, in some cases, the act of retroactively processing the at least some of the buffered packets comprises forwarding some or all packets belonging to the session in the buffered packets to one or more instrument ports (e.g., instrument port 128, instrument port 129, etc.) at the network device 100. In the scenario in which only some but not all of the packets belonging to the session are forwarded to the instrument port(s), the amount of packets being forwarded may be user-prescribed. For example, the user may prescribe that only the first 30 packets be forwarded, or only packets that are received within a certain duration (e.g., 5 minutes) be forwarded.

In other cases, the act of retroactively processing the at least some of the buffered packets comprises dropping at least one of the buffered packets, or modifying at least one of the buffered packets.

In some cases, the method 400 may further include: receiving a second plurality of packets belonging to the identified session after the additional packet is received; and forwarding all or a subset of the second plurality of packets received after the additional packet is received to one or more instrument ports at the network device. The subset may be user-defined based on a number of packets (e.g., forward 100 packets belonging to the session to the instrument port(s)), and/or a prescribed duration (e.g., forward packets received within 3 minutes to the instrument port(s)).

In some embodiments, the processing unit 142 in the network device 100 of FIG. 1/FIG. 3 may be a specialized processing unit configured to perform one or more functions described herein. For example, in some embodiments, the processing unit 142 may be configured to identify a session to which a packet belongs, to analyze additional packets received after the session is identified to determine if any of the additional packets belongs to the identified session, to retroactively process buffered packets to determine if any of the buffered packets belongs to an identified session, to retroactively process buffered packets by forwarding some or all packets in the buffered packets belonging to an identified session to one or more instrument ports, or any combination of the foregoing. In one implementation, the processing unit 142 may have a session identification module that includes an input for receiving a packet and a comparator for comparing content of the packet with one or more prescribed values (e.g., regular expression) to determine if there is a match. If so, the session identification module that determines that a session has been identified. Also, in one implementation, the processing unit 142 may include a packet association module that includes an input for receiving an additional packet (that is received after the session has been identified), and a comparator for comparing content of the additional packet with one or more prescribed values (e.g., header values) to determine if the additional packet is associated with the session that has been identified. In some cases, the input of the packet association module may also be configured to receive additional packet (that is received before the session is identified), such as a packet that is buffered before the session is identified. In such cases, the comparator of the packet association module is configured to also compare content of the additional packet with one or more prescribed values (e.g., header values) to retroactively determine if the buffered packet (received before the session is identified) is associated with the session that has been identified.

In some cases, the processing unit 142 may include a user-interface module that is configured to generate information for display on a screen. The user-interface may be configured to allow a user to input one or more criteria for identifying a session, and/or one or more action rules for processing packets belonging to certain session. The one or more action rules may be for processing packets belonging to certain session that is received after the session is identified, for retroactively processing packets belonging to certain session that is received before the session is identified, or both. For example, the user-interface may allow a user to prescribe whether to forward all or a subset of all packets belonging to a certain session that are received after the session is identified. In some cases, the subset may be defined by a user based on a number of packets (e.g., 100 packets to be forwarded to one or more instrument ports) or a time duration (e.g., forward packets received within 2 minutes to one or more instrument ports). As another example, the user-interface may allow a user to prescribe whether to retroactively forward all or a subset of all packets belonging to a certain session that are received before the session is identified. In some cases, the subset for the retroactive processing may be defined by a user based on a number of packets (e.g., 100 packets to be forwarded to one or more instrument ports) or a time duration (e.g., forward packets received within 2 minutes to one or more instrument ports).

Also, in some cases, the user-interface module may generate the information in response to a command entered by a user. For example, the user may enter a request for a list of network monitoring instruments and/or medium that are communicating with the network device 100 (either directly or indirectly) through certain instrument port(s). In another example, the user may enter a request for a list of sessions that have been identified. In further example, the user may enter a request for packet processing statistics, such as a number of packets in a certain session that have been forwarded to which instrument port(s). In response to any of the above requests, the processing unit 142 (e.g., the user-interface module therein) may then retrieve the relevant information from a non-transitory medium, processes them, and then transmits the information for display on a screen. The non-transitory medium may be in the network device 100, or may be external to the network device 100 that is communicating with the non-transitory medium.

Also, in some embodiments, the user-interface may allow a user to define an "end of session". For example, a user may input a maximum number of packets or a maximum duration, which when reached, would indicate that an end of session is reached.

In addition, in some embodiments, the network device 100 may be configured to perform a cleaning process for the session when an end of session is reached. For example, the cleaning process may include clearing out table entries, resetting a state of a buffer, deleting stored packets, etc., or any combination of the foregoing. In some cases, the end of session may be considered reached when a user-defined time (e.g., duration) is reached, when a maximum number of sessions is reached, when there is an inactivity for a pre-scribed duration, or when another criterion (e.g., receiving a TCP reset) is met.

Figure 5:
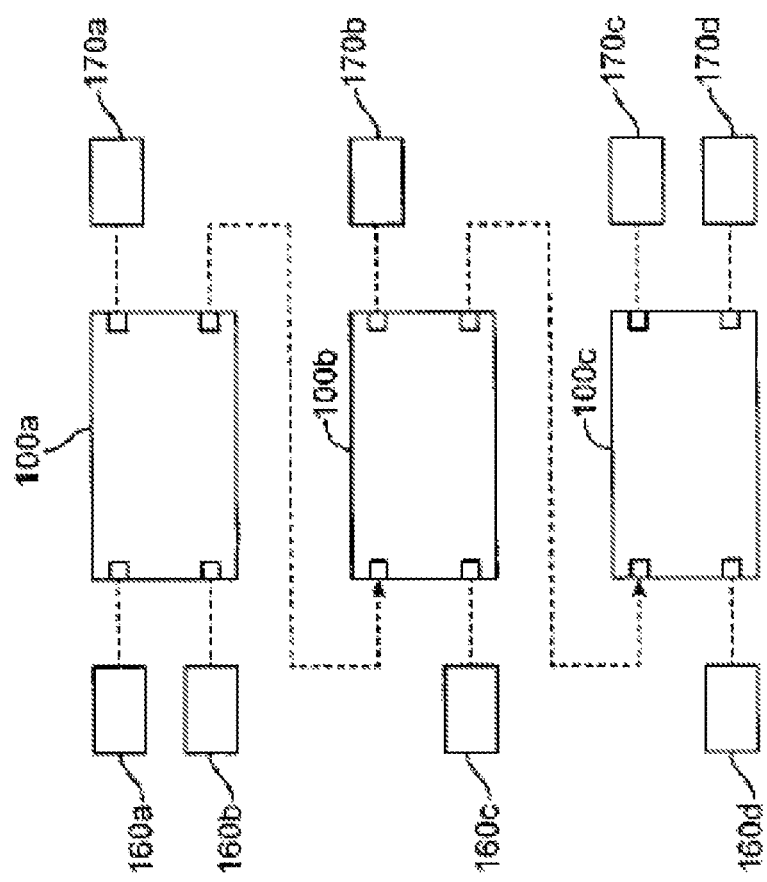
FIG. 5 illustrates a network switch appliance in a stacked configuration with one or more additional network switch appliance(s) in accordance with some embodiments.

In the above example, the network device 100 has been illustrated as a single network appliance. In other embodiments, the network device may comprise a multiple network appliances. Thus, as used in this specification, the term "device" may refer to a single appliance/component, or to a plurality of appliances/components that are connected or communicatively coupled together. For example, in other embodiments, the method 200 may be performed by a plurality of network switch devices 100 that are stacked together. Also, in some embodiments, any of the above features that is described as being performed by the network switch device may alternatively be performed by a plurality of network switch devices 100 that are stacked together. Similarly, in some embodiments, any of the above features that is described as being performed by the processing unit 142 may alternatively be performed by a plurality of processing units 142 at the respective network switch devices 100 that are stacked together. FIG. 5 illustrates an example of a stacked configuration in which multiple network switch devices 100a-100b are stacked together. Network switch device 100a is communicatively coupled to a network monitoring instrument 170a, and nodes 160a, 160b. Network switch device 100b is communicatively coupled to a network monitoring instrument 170b, and node 160c. Network switch device 100c is communicatively coupled to network monitoring instruments 170c, 170d, and node 160d. In some embodiments, the stacked network switch devices 100 may be considered to be a network switch appliance or switch device itself. Accordingly, as used in this specification, the term "network device" may refer to a single network appliance, or multiple network appliances.

Figure 6:
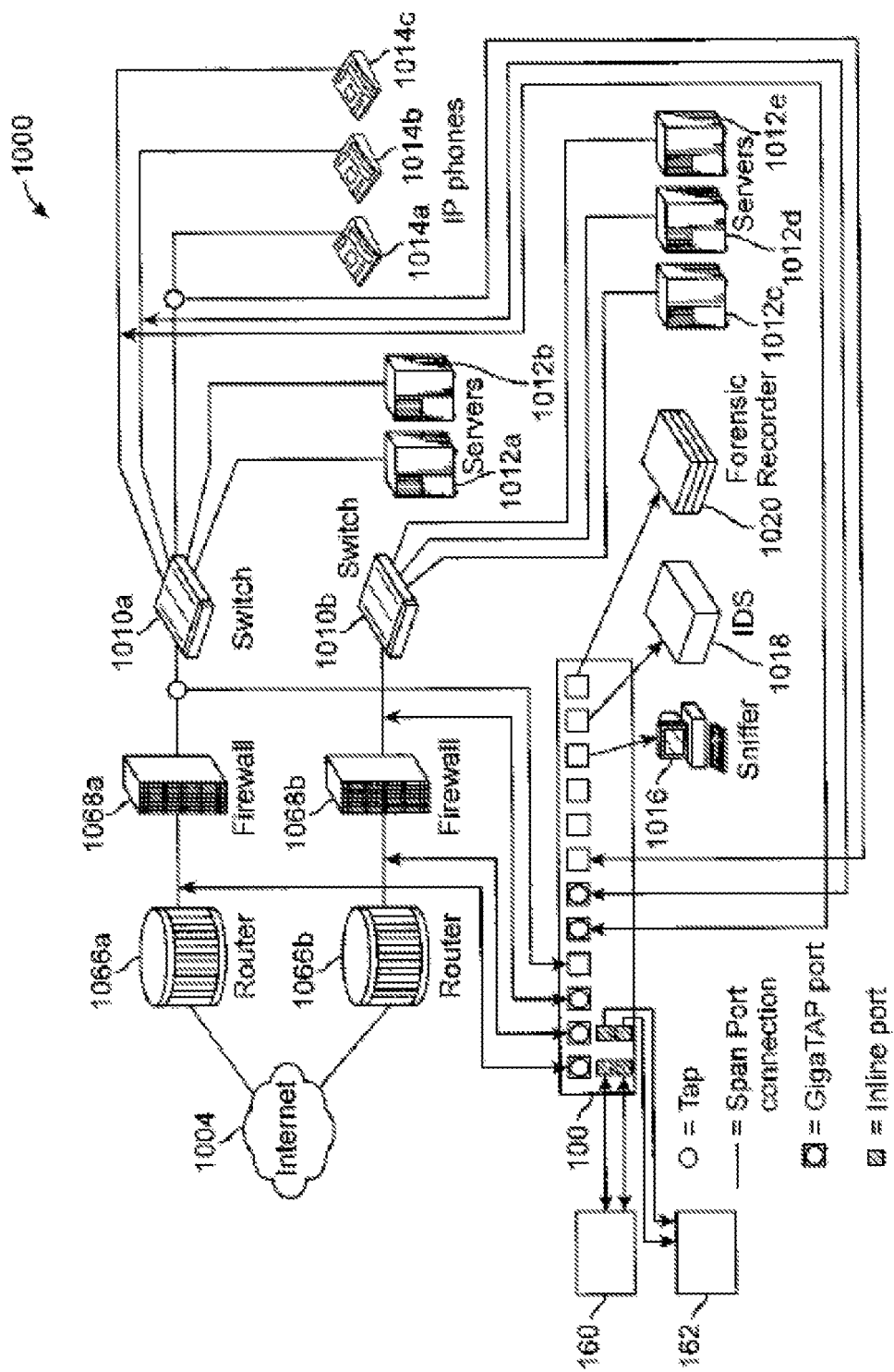
FIG. 6 illustrates a deployment of a network switch appliance in accordance with some embodiments.

FIG. 6 shows the deployment of the network switch device 100 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 100. As illustrated in FIG. 6, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function.

In some embodiments, when using the device 100, one or more non-pass through instruments (such as IDS, sniffer, forensic recorder, etc.) may be connected to instrument port(s), and one or more pass through instruments (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 100, the device 100 can compare whether the IDS or the IPS sees more threats, and/or can have a redundant protection such that if the IPS misses any threat, the IDS may pick it up.

Specialized Processing System Architecture

Figure 7:
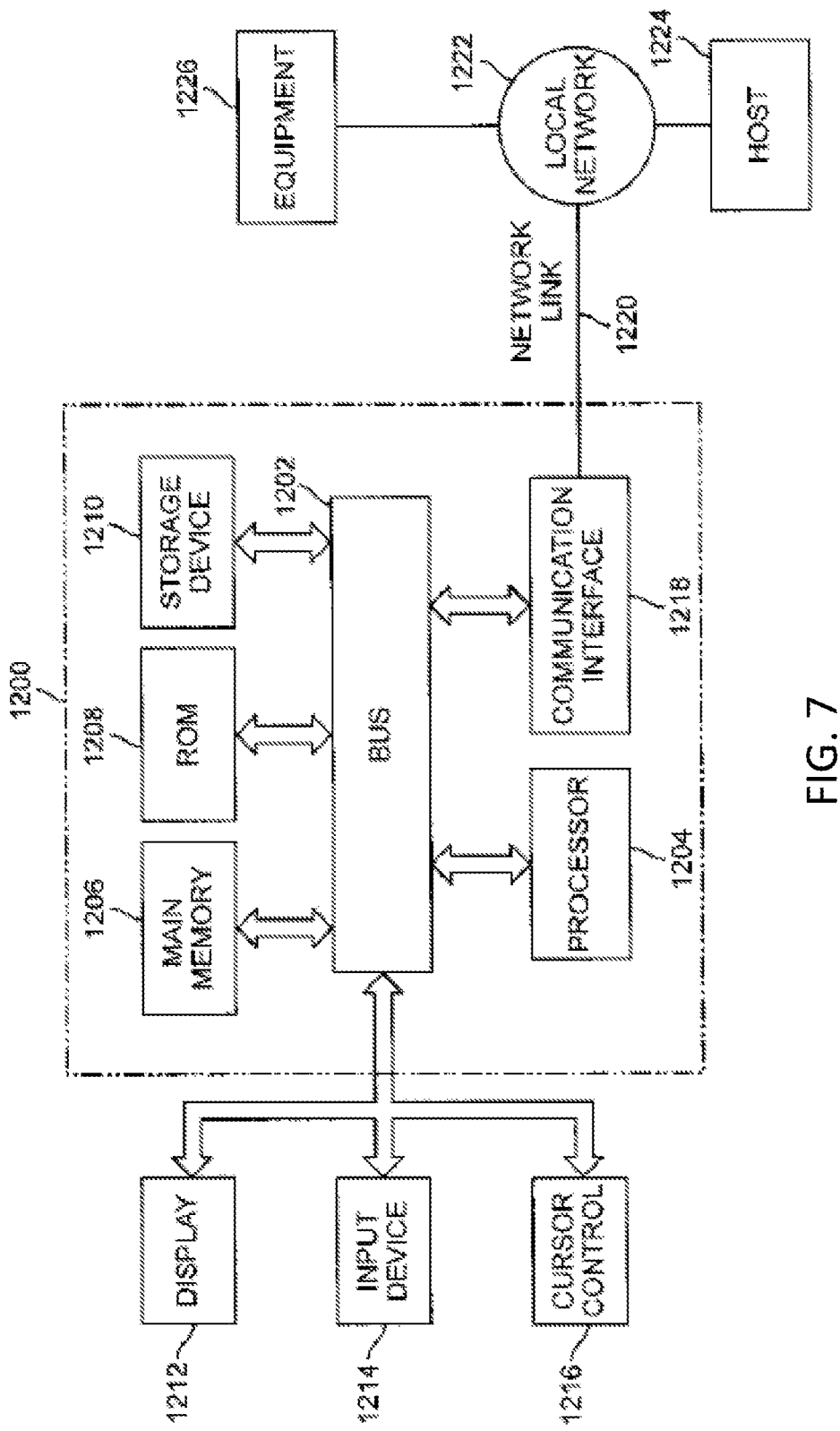
FIG. 7 illustrates an example of a specialized computer system with which embodiments described herein may be implemented.

FIG. 7 is a block diagram that illustrates an embodiment of a specialized processing system 1200 upon which embodiments described herein may be implemented. For example, in some embodiments, the specialized processing system 1200 may be used to implement one or more functions of the processing unit 142 described herein. Processing system 1200 includes a bus 1202 or other communication mechanism for communicating information, and a specialized processor 1204 coupled with the bus 1202 for processing information. The specialized processor 1204 may be used to perform various functions described herein. For example, in some embodiments, the specialized processor 1204 may be configured to identify a session to which a first packet belongs, perform a packet processing action (such as, to forward the first packet to one or more instrument ports, to drop the first packet, to modify the first packet, etc.) based on the identified session, to forward all packets or a subset of all packets belonging to the session received after the first packet is received to one or more instrument ports, to retroactively forward some or all packets belonging to the session that were received before the first packet to one or more instrument ports, or any combination of the foregoing.

The processing system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The processing system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The processing system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys.

The processing system 1200 may be used for performing various functions in accordance with the embodiments described herein. According to one embodiment, such use is provided by processing system 1200 in response to processor 1204 executing one or more sequences of one or more instructions contained in the main memory 1206. Such instructions may be read into the main memory 1206 from a computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the processing system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The processing system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the processing system 1200, are exemplary forms of carrier waves transporting the information. The processing system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it. Also, a "packet" may refer to any part of a packet. For example, a "packet" may be a header of a packet, a payload of a packet, or both.

It should be noted that the terms "first", "second", etc., are used to refer to different things, and do not necessarily refer to the order of things. For example, the term "first packet" may refer to any packet generated and/or received in any order, and should not be limited to a packet that is the first in order. Thus, the term "first packet" may be any packet, such as the first packet in the order, or any packet after the first packet in the order.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method comprising:
receiving, by a network device, a plurality of packets from a network;
storing, by a network device, the plurality of packets in a buffer while a session to which the plurality of packets belong has not been identified by the network device;
receiving, by the network device, a first packet from the network, wherein the first packet is not one of the plurality of packets;
identifying, by the network device, a session to which the first packet belongs, after storing the plurality of packets in the buffer, based on the first packet satisfying a first criterion, wherein the first criterion comprises the first packet satisfying a regular expression;
after identifying the session to which the first packet belongs,
determining, by the network device, that one or more of the plurality of packets stored in the buffer belong to said session, and performing, by the network device, a packet processing action on the first packet and on said one or more of the plurality of packets stored in the buffer that belong to said session;
receiving a second packet by the network device after said receiving the first packet, wherein the second packet is not one of the plurality of packets;
determining, by the network device, that the second packet belongs to said session based on a plurality of header values of the second packet, wherein the second packet does not satisfy the regular expression;
in response to determining that the second packet belongs to said session, performing, by the network device, the packet processing action on the second packet, wherein the packet processing action includes forwarding, by the network device, the second packet to one or more ports of the network device, for delivery to one or more external network tools, based on the identified session.

2. The method of claim 1, wherein the first packet and the second packet belong to different types of network traffic, respectively.

3. The method of claim 1, wherein the first packet belongs to a root conversation between two nodes, and the second packet belongs to a child conversation.

4. The method of claim 1, wherein the session is unidirectional.

5. The method of claim 1, wherein the session is bi-directional.

6. The method of claim 5, wherein the first packet is a copy of a packet being transmitted from a first node to a second node, and the second packet is a copy of a packet being transmitted from the second node to the first node.

7. The method of claim 1, wherein the act of performing the packet processing action comprises dropping or modifying packets not belonging to the identified session.

8. The method of claim 1, wherein the act of performing the packet processing action comprises forwarding all packets belonging to the session received after the first packet is received, to the one or more ports of the network device.

9. The method of claim 1, wherein the act of performing the packet processing action comprises forwarding a subset of all packets belonging to the session received after the first packet is received, to the one or more ports of the network device.

10. The method of claim 9, wherein the subset is user-defined based on a number of packets, and/or a prescribed duration.

11. The method of claim 1, wherein the act of performing the packet processing action comprises dropping some or all packets identified based on a second criterion that is different from the first criterion, or forwarding some or all packets identified based on the second criterion to the one or more ports.

12. The method of claim 1, wherein the method further comprises: forwarding some or all of the buffered packets associated with the session after the session is identified; and forwarding additional packets associated with the identified session, the additional packets being received by the network device after the session is identified.

13. The method of claim 1, further comprising receiving additional packets by the network device before the first packet is received.

14. The method of claim 13, further comprising buffering the additional packets until the session is identified.

15. The method of claim 13, wherein the act of performing the packet processing action comprises retroactively forwarding some or all packets belonging to the session in the additional packets to the one or more ports of the network device, or dropping some or all of the additional packets.

16. The method of claim 13, wherein the additional packets are buffered packets.

17. The method of claim 16, wherein a size of the buffered packets is based on a maximum buffering time and/or a maximum size.

18. The method of claim 16, wherein the buffered packets include packets belonging to the session that are received before the first packet, and the method further includes retroactively identifying the packets belonging to the session from the buffered packets.

19. The method of claim 1, further comprising performing a cleaning process for the session when a user-defined time is reached, when a maximum number of sessions is reached, when there is inactivity for a prescribed duration, or when another criterion is met.

20. The method of claim 1, wherein the network device comprises a single network appliance or multiple network appliances.

21. A network device comprising:
a network port through which to receive from a network a plurality of packets, a first packet and a second packet, wherein the first packet and the second packet are not included in the plurality of packets, and wherein the second packet is received by the network device after the first packet;

a buffer;

one or more instrument ports through which to communicate with one or more external network monitoring instruments and/or one or more media; and a processing unit coupled to the network port and the one or more instrument ports, wherein the processing unit is configured to:

store the plurality of packets in the buffer while a session to which the plurality of packets belong has not been identified by the network device;

identify a session to which the first packet belongs, after storing the plurality of packets in the buffer, based on the first packet satisfying a first criterion, wherein the first criterion comprises the first packet satisfying a regular expression;

after identifying the session to which the first packet belongs, determine that one or more of the plurality of packets stored in the buffer belong to said session, and perform a packet processing action on the first packet and on said one or more of the plurality of packets stored in the buffer that belong to said session;

determine that the second packet belongs to said session based on a plurality of header values of the second packet, wherein the second packet does not satisfy the regular expression;

in response to determining that the second packet belongs to said session, perform said packet processing action on the second packet, wherein the packet processing action includes forwarding the second packet to one or more ports of the network device, for delivery to one or more of the external network monitoring instruments, based on the identified session.

22. The network device of claim 21, wherein the first packet and the second packet belong to different types of network traffic, respectively.

23. The network device of claim 21, wherein the first packet belongs to a root conversation between two nodes, and the second packet belongs to a child conversation.

24. The network device of claim 21, wherein the session is unidirectional.

25. The network device of claim 21, wherein the session is bi-directional.

26. The network device of claim 25, wherein the first packet is a copy of a packet being transmitted from a first node to a second node, and the second packet is a copy of a packet being transmitted from the second node to the first node.

27. The network device of claim 21, wherein the processing unit is configured to perform the packet processing action by dropping or modifying packets not belonging to the identified session.

28. The network device of claim 21, wherein the processing unit is configured to perform the packet processing action by forwarding all packets belonging to the session received after the first packet is received at the one or more instrument ports.

29. The network device of claim 21, wherein the processing unit is configured to perform the packet processing action by forwarding a subset of all packets belonging to the session received after the first packet is received at the one or more instrument ports.

30. The network device of claim 21, wherein the subset is user-defined based on a number of packets, and/or a prescribed duration.

31. The network device of claim 21, wherein the processing unit is configured to perform the packet processing action by dropping some or all packets identified based on a second criterion different from the first criterion, or by forwarding some or all packets identified based on a second criterion to the one or more instrument ports.

32. The network device of claim 21, wherein the processing unit is further configured for: forwarding some or all of the buffered packets associated with the session after the session is identified; and forwarding additional packets associated with the identified session, the additional packets being received by the network device after the session is identified.

33. The network device of claim 21, wherein the network port is also for receiving additional packets before the first packet is received.

34. The network device of claim 33, wherein the buffer is configured to buffer the additional packets until the session is identified.

35. The network device of claim 33, wherein the processing unit is configured to perform the packet processing action by retroactively forwarding some or all of packets belonging to the session in the additional packets to the one or more instrument ports, or by dropping some or all of the additional packets.

36. The network device of claim 33, wherein the buffer is configured to buffer the additional packets as buffered packets.

37. The network device of claim 36, wherein a size of the buffered packets is based on a maximum buffering time and/or a maximum size.

38. The network device of claim 36, wherein the buffered packets include packets belonging to the session that are received before the first packet, and the processing unit is configured to retroactively identify the packets belonging to the session from the buffered packets.

39. The network device of claim 21, wherein the processing unit is configured to perform a cleaning process for the session when a user-defined time is reached, when a maximum number of sessions is reached, when there is inactivity for a prescribed duration, or when another criterion is met.

40. The network device of claim 21, wherein the network device comprises a single network appliance or multiple network appliances.

41. A product having a non-transitory medium storing a set of instructions, execution of which by a processing unit in a network device causes the network device to perform a process comprising:

Receiving a plurality of packets from a network;

Storing the plurality of packets in a buffer while a session to which the plurality of packets belong has not been identified by the network device;

Receiving a first packet from the network, wherein the first packet is not one of the plurality of packets;

Identifying a session to which the first packet belongs, after storing the plurality of packets in the buffer, based on the first packet satisfying a first criterion, wherein the first criterion comprises the first packet satisfying a regular expression;

after identifying the session to which the first packet belongs, determining that one or more of the plurality of packets stored in the buffer belong to said session, and performing a packet processing action on the first packet and on said one or more of the plurality of packets stored in the buffer that belong to said session;

receiving a second packet after said receiving the first packet, wherein the second packet is not one of the plurality of packets;

determining that the second packet belongs to said session based on a plurality of header values of the second packet, wherein the second packet does not satisfy the regular expression;

in response to determining that the second packet belongs to said session, performing the packet processing action on the second packet, wherein the packet processing action includes forwarding the second packet to one or more instrument ports of the network device, for delivery to one or more external network monitoring tools, based on the identified session.

\* \* \* \* \*